United States Patent [19]
Kelvin et al.

[11] Patent Number: 5,028,016
[45] Date of Patent: Jul. 2, 1991

[54] MODULAR WORK STATION DESIGN FOR AIRCRAFT

[75] Inventors: Allan E. Kelvin, Centerport; Charles M. Hammerslag, Farmingville, both of N.Y.

[73] Assignee: Grumman Aerospace Corporation, Bethpage, N.Y.

[21] Appl. No.: 354,318

[22] Filed: May 19, 1989

[51] Int. Cl.$^5$ ............................................. B64D 11/06
[52] U.S. Cl. ................................. 244/122 R; 297/257
[58] Field of Search .................... 244/122 R; 297/346, 297/257, 349; D14/103; 114/194

[56] References Cited

U.S. PATENT DOCUMENTS

| D. 290,874 | 7/1987 | Wagner | D14/103 |
|---|---|---|---|
| 3,305,264 | 2/1967 | Gunn | 297/346 |
| 3,336,076 | 8/1967 | Malitte | 244/122 R |
| 4,160,534 | 7/1979 | White | 297/346 |
| 4,184,656 | 1/1980 | Wakeley | 244/122 R |
| 4,840,000 | 1/1989 | Grines | 297/346 |

Primary Examiner—Joseph F. Peters, Jr.
Assistant Examiner—Christopher P. Ellis
Attorney, Agent, or Firm—Pollock, VandeSande & Priddy

[57] ABSTRACT

A modular work station particularly suited for aircraft slidably mounts computer work station seats. The seats and work stations may be oriented in a modular manner with the seat orientation being directed toward the fore or aft ends of an aircraft to enhance operator comfort during long periods of flight. The seats are provided with a swivel capability of at least 180° to enable ingress into a walkway. During landing and take-off, the operator seat has the capability of being latched in a forward- or rearward-facing position to enhance operator safety during these conditions. The seat is slidably mounted along a track that has rear curved portions that allow a seat to slide back to an angular orientation to facilitate an operator's ingress or egress.

7 Claims, 1 Drawing Sheet

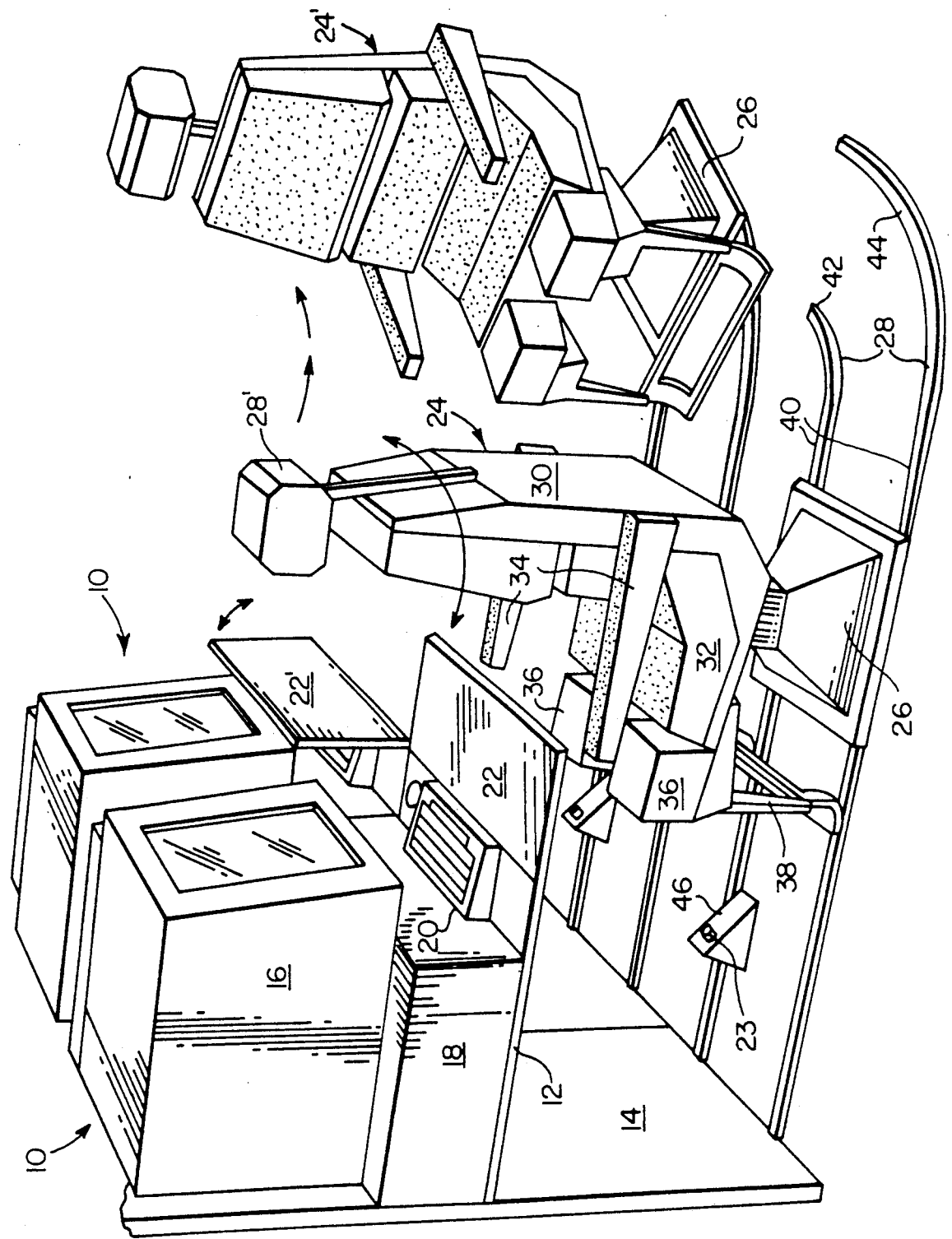

MODULAR WORK STATION DESIGN FOR AIRCRAFT

FIELD OF THE INVENTION

The present invention relates to a computer work station, and more particularly to a work station suited for aircraft or space utilization.

BACKGROUND OF THE INVENTION

During the present time large aircraft and spacecraft include computer work stations for operators who are involved in command and control functions. Due to the limited spaced in such craft, the work stations are often located in areas that confine computer operators and accelerate their fatigue. For example, in surveillance aircraft such as the AWACS aircraft, a controller sits perpendicularly to the longitudinal axis of the aircraft. When the aircraft flies in a "nose up" attitude, the controllers are forced to lean sideways to offset this orientation of the aircraft. The controllers in these positions experience fatigue, neck and back pain, headaches and other fatigue-related discomforts during prolonged missions which typically last eight hours.

When operators enter and leave a work station chair, the ingress and egress becomes difficult due to the fact that the chairs are typically bolted in place with only limited movement capability such as seat-back tilt and swivel displacement being possible.

BRIEF DESCRIPTION OF THE INVENTION

The present invention creates a seating and work station configuration which is particularly suited to be installed in a modular fashion. The controllers will sit fore and aft along the longitudinal axis of an aircraft thereby avoiding the necessity of leaning for protracted periods of time, as just discussed. Further, the seats of the present invention are intended to adjustably slide along tracks when desired so as to ease ingress and egress of a computer operator. The seats are intended to have a swivel capability of at least 180° which further assists ingress and egress into walkways adjacent to the work station. During landing and take-off, the seat has the capability of being latched in a forward- or rearward-facing position thereby enhancing safety.

BRIEF DESCRIPTION OF THE FIGURE

The above-mentioned objects and advantages of the present invention will be more clearly understood when considered in conjunction with the accompanying drawing, in which:

The perspective FIGURE illustrates a modular work station having two side-by-side work stations.

DETAILED DESCRIPTION OF THE INVENTION

The FIGURE illustrates two side-by-side modular computer terminal work stations generally indicated by reference numeral 10. A computer table 12 extends outwardly from a supporting vertical wall 14. A CRT display 16, associated computer 18, and associated keyboard 20 are supported on table 12. A drop leaf 22 articulates from the main fixed section of table 12. The drop leaf 22 is usually lowered to a co-planar position when an operator is present and working at the work station. However, the drop leaf may be raised, as indicated by reference numeral 22' in order to create more space when a seat, generally indicated by reference numeral 24, is moved away from the work station, as generally indicated by reference numeral 24'.

The seats may be of conventional design such as the flight deck seats manufactured by the Weber Aircraft Company of Burbank, Calif., and denoted as Model 83. The seat 24 is intended to have a swivel base 26 slidably mounted to the parallel track 28 provided with a releasable means (not shown) for selectively locking the base 26 at a desired point along the track 28.

The seat basically comprises a back 30 with a head rest 28' extending upwardly therefrom. A horizontal seat section 32 is enclosed by arm rests 34 and extends to under-knee pads 36 which are intended to avoid circulation constriction in the operator's legs when seated for long periods of time. A leg rest 38 extends downwardly from the pads 36 so that an operator can rest his feet thereon as he wishes.

The track 28 is seen to include two parallel straight rail sections 40 extending into curved concentric rail sections 42 and 44. The rail sections enable the chair to travel away from the work station and angularly turn the operator in a manner that will ease ingress and egress into a walkway adjacent the work stations and shown in the foreground of the FIGURE. As will be appreciated, this advantageous design avoids the necessity of a fellow operator interrupting his work and moving out of the way.

The seats 24 are designed to selectively lock in place in a longitudinal direction, either fore or aft of an aircraft which enhances the safety characteristics of the work station during take-off and landing.

A foot button 23 mounted on an angled housing 46 is provided on the floor. The purpose of this button is to allow the operator being contacted on intercom to respond without using his hands. To talk, the operator depresses button 23 with his foot, which puts him on line. The operator's head set (not shown) receives at all times. Thus, he is not required to use his hands to use the intercom and they are free to be used at that time for work station related tasks.

It should be understood that the invention is not limited to the exact details of construction shown and described herein for obvious modifications will occur to persons skilled in the art.

We claim:

1. An aircraft computer work station comprising:
a table surface for supporting a computer terminal;
a seat located adjacent the terminal and movable along a track;
the track comprising
(a) a straight section oriented longitudinally of the aircraft and rearwardly with respect to the terminal;
(b) an arcuate section connected to an end of the straight section rearwardly removed from the terminal;
the seat including a base slidably mounted to the track for positioning the seat in a
first position along the straight section adjacent to and facing the terminal; and
a second position along the curved section away from the terminal whereat the seat assumes an angular orientation facing away from the terminal to facilitate ingress and egress from the seat.

2. The work station set forth in claim 1 wherein the track comprises first parallel straight sections extending to respective second curved concentric arcuate sections.

3. The work station set forth in claim 1 wherein the terminal supporting table surface comprises a fixed horizontal section for supporting the terminal and a hinged section articulating from the fixed section for movement from an operative horizontal position to a vertical position creating space which eases ingress and egress from the seat.

4. The structure set forth in claim 1 wherein the seat is selectively rotationally mounted relative to the base to permit seat swivel motion.

5. A plurality of side-by-side modular computer work stations, each of which comprises:
   a table surface for supporting a computer terminal;
   a seat located adjacent the terminal and movable along a track, the track comprising:
   (a) two parallel straight sections oriented longitudinally of the aircraft and rearwardly with respect to the terminal;
   (b) two concentric curved sections connected to the ends of respective straight sections and rearwardly removed from the terminal;
   the seat including a base slidably mounted to the straight sections of the track for positioning the seat in a first position along the straight sections adjacent to and facing the terminal; and
   a second position along the curved sections away from the terminal whereat the seat assumes an angular orientation facing away from the terminal to facilitate ingress and egress from the seat to a nearby passageway located parallel to the track straight sections.

6. The work stations set forth in claim 5 wherein the terminal supporting table surface comprises a fixed horizontal section for supporting the terminal and a hinged section articulating from the fixed section for movement from an operative horizontal position to a vertical position creating space which eases ingress and egress from the seat.

7. The work stations set forth in claim 6 wherein the seat is selectively rotationally mounted relative to the base to permit seat swivel motion.

* * * * *

UNITED STATES PATENT AND TRADEMARK OFFICE
CERTIFICATE OF CORRECTION

PATENT NO. : 5,028,016
DATED : July 2, 1991
INVENTOR(S) : Allan E. Kelvin, et al.

It is certified that error appears in the above-identified patent and that said Letters Patent is hereby corrected as shown below:

In the Abstract, line 8, after "ingress" insert --and egress--.

Column 1, line 14, change "spaced" to --space--.

Signed and Sealed this

First Day of December, 1992

Attest:

DOUGLAS B. COMER

Attesting Officer

Acting Commissioner of Patents and Trademarks